J. O. READ.
HALTER HOPPLE.
APPLICATION FILED JULY 19, 1910.
977,547.
Patented Dec. 6, 1910.
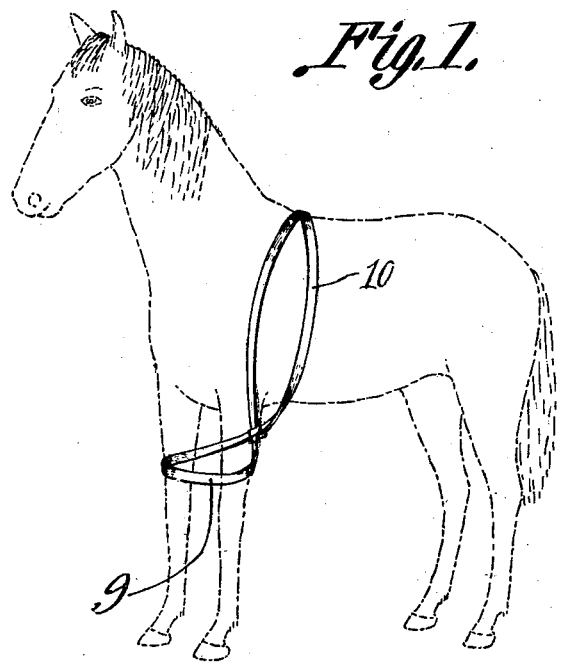
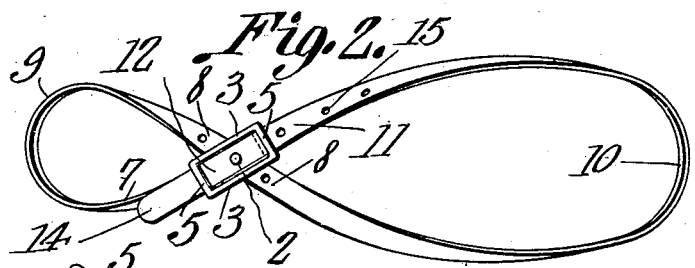
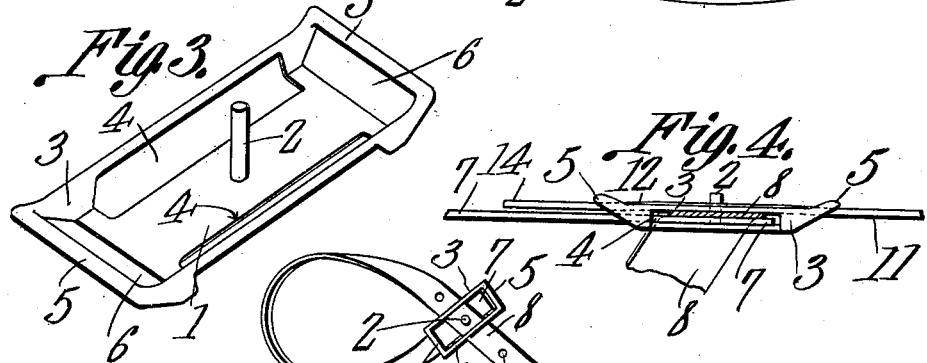
Witnesses
Joseph O. Read,
Inventor
by C. A. Snow & Co.
Attorneys

UNITED STATES PATENT OFFICE.

JOSEPH O. READ, OF OGDEN, UTAH.

HALTER-HOPPLE.

977,547.  Specification of Letters Patent.  Patented Dec. 6, 1910.

Application filed July 19, 1910. Serial No. 572,744.

*To all whom it may concern:*

Be it known that I, JOSEPH O. READ, a citizen of the United States, residing at Ogden, in the county of Weber and State of Utah, have invented a new and useful Halter-Hopple, of which the following is a specification.

It is the object of this invention to provide, in a simple, merchantable and inexpensive form, a hopple adapted to depend from the back of a draft animal to engage the legs of the animal.

Another object of the invention is to provide a hopple fashioned from a single strip of flexible material, and having its ends secured together so as to form two directly connected loops, one of which is adapted to hopple the legs of the draft animal and the other of which is adapted to encircle another portion of the body of the animal to uphold the loop which serves as a hopple.

Another object of the invention is to provide, in a one piece hopple, a means for connecting the ends of the hopple to form two loops, one of which is adapted to support the device and the other of which constitutes the hopper proper.

Another object of the invention is to provide a hopple which, at the will of the operator may readily be changed into a halter.

The drawings show but one form of the invention, and it is to be understood that changes, properly falling within the scope of what is claimed, may be made without departing from the spirit of the invention.

In the accompanying drawings, Figure 1 is a perspective showing the hopple applied; Fig. 2 is a perspective showing the device on an enlarged scale, removed from the animal; Fig. 3 is a perspective of the securing device; Fig. 4 is a side elevation of the securing device with the hopple-forming member therein, parts being sectioned and broken; and Fig. 5 is a fragmental perspective showing the device as it will appear when used as a halter.

In carrying out the invention, a retaining element is provided, the same consisting of a base plate 1, from the central portion of which uprises a stud 2. The side walls 3 which rise from the base plate 1 are provided with elongated openings 4 hereinafter, for convenience, referred to as the secondary openings. At their ends the side walls 3 are connected by cross bars 5 spaced above, and slightly beyond the ends of the base plate 1, these cross bars 5 defining, at the ends of the device openings 6 disposed at an angle to the secondary openings 4 and hereinafter, for convenience denominated the primary openings. A flexible element, preferably a leather strap has one of its ends extended through one of the primary openings 6, as shown at 7, and engaged over the stud 2, in one of a plurality of openings 15 disposed at suitable points along the flexible member. The free end of the flexible member is then carried through both of the secondary openings 4, as shown at 8, and engaged over the stud 3, thus forming a loop 9 which is adapted to engage the legs of the animal. The loop 10 which encircles the back of the animal, is fashioned by passing the free end of the flexible member through the unencumbered primary opening 6, as shown at 11 and thence over and engaged by the stud 2, as shown at 12, the extremity of the flexible element being passed, as denoted by the numeral 14 through the other primary opening 6 in which the other end of the flexible member was engaged in the first instance, as shown at 7.

It will be seen that by successively engaging the stud 2 in the openings 15 in the flexible member, both the leg encircling loop 9 and the body encircling loop 10 may be made larger or smaller as desired. Moreover, by removing the terminal portion 14 of the flexible member from the stud 2, and withdrawing the said terminal portion from the primary openings 6, the leg loop 9 will be disposed at the end of a straight strip of material, the device in such instance, being capable of use as a halter, as seen in Fig. 5.

Although the particular securing device hereinbefore shown and described is well adapted for use in a construction of this character, it is obvious that any other means may be employed for connecting the ends of the flexible member, in order to form the loops 9 and 10.

It will be seen that the device is so constructed that the loop 9 may be placed about the neck of an animal, the end 14 of the flexible member hanging free in which instance the device serves as a halter, whereby the animal may be led to any desired point and there hoppled, by securing the loop 9 around the legs of the animal and passing the free terminal of the flexible member through the primary openings 6 to engage the stud 2, the device in such instance being positioned to serve as a hopple.

Having thus described the invention, what is claimed is:—

1. A hopple fashioned from a single strip of flexible material having its ends overlapped upon its intermediate portion, to form two connected loops; and a device for securing the ends and the intermediate portion of the strip together.

2. A device of the class described including a retaining member, consisting of a base plate having oppositely disposed primary openings and oppositely disposed secondary openings placed at an angle to the primary openings, and a stud rising from the base plate; and a flexible member having one end extended through a primary opening and engaged by the stud, the free end of the flexible member being thence carried through the secondary openings to form a leg encircling loop, and thence carried through the other primary opening and engaged by the stud to form a body encircling loop.

In testimony that I claim the foregoing as my own, I have hereto affixed my signature in the presence of two witnesses.

JOSEPH O. READ.

Witnesses:
  WELCOME D. SHAW,
  LELAND O. READ.